3,151,087
CORROSION INHIBITING COMPOSITIONS
AND METHOD
John W. Ryznar, La Grange, and Theodore R. Newman, Oak Lawn, Ill., assignors to Nalco Chemical Company, a corporation of Delaware
No Drawing. Filed Dec. 9, 1957, Ser. No. 701,299
5 Claims. (Cl. 252—387)

This invention relates to new and improved corrosion inhibiting compositions and to a new and improved method of inhibiting corrosion. The invention is particularly concerned with corrosion inhibiting compositions for preventing or inhibiting underwater corrosion in systems where water is moving, as through condensers, engine jackets, spray or cooling towers, and distribution systems. The invention is especially valuable in inhibiting corrosion of ferrous metals, including iron and steel.

It is known that various phosphates will inhibit underwater corrosion on ferrous metals under certain conditions. The dosage of the phosphate will vary depending upon such factors as the velocity of the water, the temperature and the chemical content of the water. Some phosphates are more effective than others in certain types of waters. Thus, if the water contains very much calcium the use of an orthophosphate is undesirable because the calcium phosphate scale is deposited in the pipes and tubes, thereby producing a result which may be worse than the corrosion. The corroding tendency of the water is greatly increased by the presence of sodium chloride and sodium sulfate. As the velocity of the water increases the dosage of phosphate required to inhibit corrosion normally decreases, and as the temperature of the water is increased the dosage of phosphate needed to inhibit corrosion increases.

A major advance in the use of polyphosphates in the inhibition of corrosion in heat interchangers wherein the water is circulated for cooling purposes came with the development of a "synergized cyanide-phosphate treatment" as, for example, that described in Ryznar et al. United States Reissue Patent No. 23,740, of November 17, 1953. The synergized treatment therein described involved the addition of a small amount of a cyanide to a polyphosphate combination and resulted in a marked lowering in corrosion rates as well as in the quantitative level of phosphate treatment necessary to obtain corrosion inhibition. The benefit thereby obtained lay in a substantial increase in the protection against corrosion and in the lowering of the phosphate level essential. Lowering of the phosphate level minimizes the danger of deposition of calcium phosphate sludge due to polyphosphate reversion and lack of pH control.

It has now been found that the addition of certain metallic cations in carefully controlled small quantities when incorporated with a synergized cyanide-phosphate treatment of water further increases the protection against corrosion. Metallic cations useful for this purpose include cobalt, cerium, chromium, manganese, cadmium, lead, zinc, tin and nickel. Of this group zinc and cadmium are preferred as a result of overall considerations.

One of the objects of this invention is to provide new and improved corrosion inhibiting compositions.

A second object of this invention is to provide new and improved corrosion inhibiting compositions which are effective in preventing or retarding corrosive effects of cooling waters on ferrous metals under a variety of temperature conditions.

Another object of this invention is to provide a new and improved method for increasing the corrosion inhibition of treated cooling waters.

A still further object of the invention is to provide a synergistic chemical composition comprising phosphate ions, the cyanide grouping, and certain selected metallic cations which is useful within a relatively narrow quantitative range as an additive in water treatment to inhibit corrosion.

Another object is to provide a new and improved method of inhibiting corrosion of ferrous metals in heat interchangers wherein water is used as a heat exchange medium.

Other objects will appear as the invention is more fully described.

The improved corrosion inhibitor compositions of this invention are prepared by intimately mixing or blending a corrosion inhibiting phosphate with a compound containing a cyanide (CN) group, preferably a complex inorganic cyanide, and a water-solute compound containing one or more of the metal ions including cobalt, cerium, chromium, manganese, cadmium, lead, zinc, tin and nickel in a carefully controlled amount. Other additives are not precluded and may include tabletting or briquetting binders, algicides, bactericides and/or other water treating chemicals. Especially favorable results have been obtained with intimate mixtures of super-cooled glassy septaphosphate, tetrasodiumpyrophosphate, sodium ferrocyanide, and zinc sulfate. Orthophosphates (e.g. $NaH_2PO_4$, $Na_2HPO_4$, $Na_3PO_4$ and the like) and polyphosphates are useful as well as blends of ortho and polyphosphate.

Polyphosphates are used as corrosion inhibitors in cooling water systems in preference to orthophosphates because of (a) superior corrosion inhibition, (b) stabilization characteristics which tend to minimize deposition of calcium carbonate scale, and (c) a lesser tendency towards the deposition of calcium phosphate sludge. Polyphosphates undergo reversion with time, however, resulting in the formation of appreciable amounts of orthophosphate mixed in with the polyphosphates.

When in solution in the treated water the amount of the added metallic cation material is preferably 1 to 8 parts per million (p.p.m.) and should be maintained at less than 10 p.p.m., for at about this concentration the addition of metallic cation normally useful for the purpose of this invention either serves no useful purpose or becomes detrimental. Acceleration of corrosion rate over that of the synergized cyanide-phosphate has been observed with some added metallic cations at levels as low as 10 p.p.m.

In order to evaluate the invention, three basic testing techniques were used. The first was a simple screening test of more or less qualitative nature. This test procedure consisted in rotating a solid metal cylinder at a constant speed for 24 hours in a synthetic water containing the usual contaminants found in coolant waters to which the chemical inhibitor composition to be tested had been added. At the end of the test period the specimen tested was evaluated visually for surface deterioration. This initial screening test provided a rapid method of determining significant differences in the behavior of corrosion inhibitors to be evaluated. The initial testing procedure is described as follows:

*Rotating rod test.*—The test specimens used are mild steel rods (S.A.E. 1010) ¼ inch in diameter and 3 inches long. In preparing the rods for the test they are abraded with emery paper of decreasing coarseness down to 2/0 (Norton Abrasives) while rotating in the chuck of a motor. The rods should be free of any visible scratches or lines when ready for use. Immediately before immersing the rods in the test water they are again abraded with 2/0 emery paper and then filter paper.

The test solution is prepared in a 600 ml. beaker. 500 ml. of the test water is used. The treatment is added (generally from a stock solution) and the pH adjusted to 7.0 with $H_2SO_4$ or NaOH. The test water is one prepared to simulate a typical cooling water. This synthetic water has the following composition (herein identified as NT water):

|  | P.p.m. |
|---|---|
| Total hardness (as $CaCO_3$) | 400 |
| Calcium hardness (as $CaCO_3$) | 250 |
| Magnesium hardness (as $CaCO_3$) | 150 |
| Total alkalinity (as $CaCO_3$) | 5 |
| Sulfate (as $Na_2SO_4$) | 1400 |
| Chloride (as NaCl) | 500 |

The test rod is immersed and rotated in the test solution for 24 hours. The test is run at room temperature which is about 75° F. At the end of this time the rod is removed from the water and air dried. The rod is then examined for coatings, deposits, local attack, general attack, etc., and scored as follows:

SPECIMEN CONDITION

|  | None | Slight | Moderate | Bad | Very Bad |
|---|---|---|---|---|---|
| Discoloration | 10 | 6 | 4 | 0 |  |
| General corrosion | 20 | 15 | 10 | 5 | 0 |
| Local corrosion | 40 | 25 | 10 | 0 |  |
| Roughening | 10 | 6 | 4 | 0 |  |

Condition of Liquid:
  Cloudiness—None 4, Slight 3, Moderate 2, Bad 0.
  Precipitate—None 8, Slight 5, Moderate 2, Bad 0.
  General Appearance—Good 8, Fair 6, Poor 4, Bad 2, Very Bad 0.

The second testing procedure was more quantitative in nature and involved measurement of corrosion rates of metallic coupons. These were subjected to certain specific sets of test conditions designed so as to approximate those found in field operation which contribute to the corrosion. While it was obviously necessary to make some adjustments for small scale laboratory testing, a strong effort was made to incorporate those variables which are the major factors in causing corrosion in heat exchanger system associated with cooling towers. The principal corrosive factors operating on the coupons were:

High dissolved oxygen level
High chlorides, sulfates and total dissolved solids
Low alkalinity, low pH (6–6.5)

The procedure was as follows:

*Multi-purpose corrosion test*:—This test combines the advantages the "batch" type test and the "once through" test and is essentially an intermittent, once through test. With this system, conditions are maintained constant throuhgout the test while a relatively small volume of water is used.

The equipment consists of a series of individual units. Each unit is complete and independent of the others. It consists of two connected five gallon bottles that form the reservoirs for the test water. The water flows from the reservoir by gravity to a float valve assembly that controls the head level. From there the water passes through a solenoid valve that is activated by an electrical timer. The timer opens the valve every five minutes to allow 35 ml. of water to flow into the test vessel that is partially immersed in a constant temperature oil bath at 150° F. The rate of flow is about 10 liters per day, corresponding to a fourfold replacement of the water daily. The water leaves the test vessel through an overflow tube. The control water used in this test has the same composition as the one used in the "rotating rod test" described as NT water.

The test specimens are made of No. 20 gauge S.A.E. 1010 mild steel, and are 1 inch wide and 2 inches long. They are suspended in the test vessel from a 3/16" hole drilled 1/4" from the short edge. The panels are prepared by sandblasting with "Flint Shot" sand. After sandblasting they are cleaned first in toluene and then acetone, and weighed and placed in the test vessel. They are then suspended from glass hooks in the test vessel. After the test, they are removed and then cleaned by a 30 sec. immersion in muriatic acid inhibited with formaldehyde. They are then removed from the acid and neutralized in a soda ash solution. The panels are then rinsed in water, dipped in acetone and air dried. Test panels are stored in a heated cabinet at 105° F. before weighing.

The test vessel is a Pyrex jar 6 inches in diameter and 8 inches tall, with an overflow tube at a point two inches from the top. The vessel is covered by a stainless steel lid that has a hole in the center to accommodate the stirrer, and holes around the edge for mounting the glass hook holders. The stirrer has a 1" × 2" paddle and rotates at 175 r.p.m. There are also holes in the lid to admit the tube from the reservoirs, and an aerator. The tests are aerated continuously.

These tests can be run for any length of time desired. Six metal test coupons can be mounted in each test vessel. One is removed periodically to determine if the corrosion rates have leveled off. During the first few days of a test run the corrosion rates are relatively high and tend to be less reproducible, and for this reason it is necessary to run the test longer. The corrosion rates generally level off in between three and seven days. The initial corrosion rate for the system with no inhibitor present is about 80 m.p.y. (mils per year). After an exposure of 15 days, the rate will reach equilibrium at about 50 m.p.y.

While a standard NT water was used in the tests hereinafter described, variations covering the whole range of cooling waters usually available over the country-side were checked with results similar to those obtained with the standard NT water.

The invention will be further illustrated but is not limited by the following examples in which the quantities are stated in parts by weight unless otherwise indicated.

EXAMPLE I

An anti-corrosive additive as disclosed and claimed in U.S. Reissue Patent 23,740 was prepared by pulverizing and intimately mixing the following ingredients:

29 parts of super-cooled glassy septaphosphate $Na_9P_7O_{22}$ [1]
29 parts of tetrasodium pyrophosphate
22 parts of sodium ferrocyanide
5.4 parts soda ash
3.7 parts of a lignosulfonate product [2]
4.6 parts of water The product mixture is herein identified as anti-corrosive base I. The soda ash and the lignosulfonate in this mixture do not substantially affect the corrosion inhibiting properties of the composition.

EXAMPLE II

A portion of the synthetic cooling water previously described and identified as NT water was treated with a sufficient amount of the anti-corrosive base I to provide a level of 40 p.p.m. of the phosphates therein as $PO_4$. The thus prepared water is hereinafter identified as ST water.

Aliquot portions of the ST water of approximately 500 ml. were measured out in a series of beakers identified as shown in the following table. To each beaker, except one retained as a control, was added sufficient of a water-soluble salt of a selected metal to provide 2 p.p.m. of the selected metal cation. The so prepared solutions were used in the first described simple screening test wherein a rotating solid metal cylinder is subjected to intimate contact with the corrosive waters at

---

[1] The above material has a typical analysis of 63.5% $P_2O_5$; 34.5% $Na_2O$; a density of 84 lbs. per cu. ft., and a pH in 1% aqueous solution of 7.1.
[2] This material is a mixture of the calcium salt of lignosulfonic acid, invert sugars and resins of 94 to 96% dry solids. The invert sugars are present in a range from 17 to 22%, the lignin sulfonate from 45 to 55%, natural resins from 1 to 2%, sulphur from 5 to 7%, and 10 to 15% ash which is predominantly calcium and magnesium containing minor traces of iron, alumina and silica.

about 75° F. At the end of the standard 24 hour test period the rods were removed, dried, examined, and scored in accordance with the aforementioned scoring schedule. The results of the test along with an identification of the metal cations added is set forth in the following table:

*Table I*

| Test Sample | Metal Cation | Corrosion Test Score |
|---|---|---|
| 2–1 | Cobalt | 97 |
| 2–2 | Cerium | 96 |
| 2–3 | Chromium | 96 |
| 2–4 | Manganese | 96 |
| 2–5 | Cadmium | 96 |
| 2–6 | Lead | 95 |
| 2–7 | Zinc | 95 |
| 2–8 | Tin | 94 |
| 2–9 | Nickel | 93 |
| ST water control | Control—None | 92 |
| 2–10 | Uranium | 89 |
| 2–11 | Strontium | 86 |
| 2–12 | Thorium | 85 |
| 2–13 | Zirconium | 81 |
| 2–14 | Ferric Iron | 81 |
| 2–15 | Antimony | 69 |
| 2–16 | Beryllium | 43 |
| 2–17 | Aluminum | 30 |

As will be noted in the table above, certain of the added cations enhance the corrosion resistance of the aqueous coolant system while some, and particularly antimony, beryllium and aluminum, accelerated the corrosion rate of the treated water.

EXAMPLE III

The zinc, tin and manganese cations of Example II were selected as representative of the metal cations demonstated in Example II to be useful to enhance the corrosion inhibiting quality of the synergistic phosphate composition described in Example I. A second series of 600 ml. beakers were identified and filled to about a 500 ml. level with the previously prepared ST water. The sulfate salts of zinc, tin and manganese were weighed out in such quantities as when added to and dissolved in the appropriately labeled beakers a variety of levels of the various ions were present in the ST water in accordance with the following table. Into each of the test beakers was inserted a freshly prepared test specimen of mild steel as previously described. The rotating rod corrosion test was carried forward for 24 hours and the test rod specimens removed and subjected to visual examination and scoring in accordance with the foregoing rating schedule. The results of this screening test are set out in the following table:

*Table II*

| Beaker Identity | Cation Level (p.p.m.) | Corrosion Test Score |
|---|---|---|
| 3–1 | Control ST water | 92 |
| 3–2 | Zinc–1 | 96 |
| 3–3 | Zinc–2 | 95 |
| 3–4 | Zinc–4 | 95 |
| 3–5 | Zinc–8 | 95 |
| 3–6 | Zinc–10 | 92 |
| 3–7 | Sn–2 | 94 |
| 3–8 | Sn–10 | 83 |
| 3–9 | Mn–2 | 96 |
| 3–0 | Mn–10 | 92 |

From the data set out in above table, it becomes evident that when the amount of the added metal cation of those known to be advantageous approaches a level of 10 p.p.m. the corrosion inhibition of the water treatment additive composition is at least leveled off if not impaired. In order to obtain the desirable end result of enhancing the corrosion inhibition of the synergized polyphosphates, it is necessary to limit the amount of the metallic cation in solution to less than 10 p.p.m. of the selected cation.

EXAMPLE IV

A portion of the synthetic cooling water solution previously identified as NT water was further treated by addition thereto of anti-corrosive base I in such an amount as to give an aqueous solution having 30 p.p.m. level of $PO_4$. This aqueous solution was identified as ST–2.

Three five-gallon aliquots of solution ST–2 were measured out into three five-gallon appropriately identified jugs. To the first jug identified as 4–1 was added 2 p.p.m. of zinc ion (as the sulfate). To the second jug identified as 4–2 was added 2 p.m.m. of cadmium ion (also as the sulfate). The third jug identified as 43 contained the control solution ST–2 without additions.

Test specimens as described under the Multi-Purpose Corrosion Test were subjected to the MPCT and the rate of corrosion determined at the end of two, four, eight and twelve days of exposure of the test steel coupons. Data obtained as a result of the testing procedure are recorded in the following table:

*Table III*

| Jug Identity | Days of Test | Corrosion Rate, mils per year (m.p.y.) |
|---|---|---|
| 4–1 (zinc) | 2 | 18.5 |
|  | 4 | 9.2 |
|  | 8 | 7.8 |
|  | 12 | 4.8 |
| 4–2 (Cd) | 2 | 12.4 |
|  | 4 | 7.6 |
|  | 8 | 7.2 |
|  | 12 | 4.0 |
| 4–3 (ST–2) | 2 | 27 |
|  | 4 | 15.5 |
|  | 8 | 13.0 |
|  | 12 | 8.6 |

The tabulated figures of Table III show a lowered corrosion rate at any comparable time period in the test where zinc and cadmium ions are present in the test water over the water treated with synergized polyphosphate composition of itself. Similar test data to that set out above reveals a more quantitative relationship between the synergized polyphosphate inhibitor alone and the inhibitor plus 2 p.p.m. of added metal cation of zinc and cadmium. Thus at 20 p.p.m. of synergized polyphosphate plus traces of zinc or cadmium the corrosion rate is as low as at 40 p.p.m. of the synergized polyphosphate alone. Reduction of the total $PO_4$ content essential to reduce corrosion rate to a minimum is of considerable advantage in reducing the danger of the deposition of calcium phosphate sludge due to polyphosphate reversion and lack of pH control in cooling waters.

It has also been found that the cooling water treatment compositions comprising polyphosphate containing a synergistic amount of the cyanide group is also of value in inhibiting the rate of corrosion of admiralty metal. The following example demonstrates the usefulness of the composition and the method of this invention for inhibiting the corrosion of that specific heat exchange metal:

EXAMPLE V

Three five-gallon containers were filled with the following solutions:

Container 5–1 contained the synthetic water of Example 2 without treatment or NT water Container 5–2 contained NT water to which was added sufficient of the anticorrosive base I to provide 30 p.p.m. of $PO_4$ and the content thereof identified as ST–2

Container 5–3 contained water similar to that in 5–2 except it contained in addition 2 p.p.m. of zinc ion.

These solutions were then used in accordance with the previously described Multi-Purpose Corrosion Test wherein the steel specimens were substituted for with similar coupons of admiralty metal. The test coupons were subjected to treatment in accordance with the Multi-Purpose Corrosion Test and the corrosion rate of the samples determined at one, three and seven day intervals. The data obtained as a result of the test is set forth in the following table:

Table IV

| Solution Identity | Days of Test | Corrosion Rate (m.p.y.) |
|---|---|---|
| 5-1 (NT) | 1 | 5.2 |
|  | 3 | 2.5 |
|  | 7 | 1.7 |
| 5-2 (ST-2) | 1 | 3.4 |
|  | 3 | 2.2 |
|  | 7 | 1.5 |
| 5-3 (ST-2+Zn++) | 1 | 3.2 |
|  | 3 | 1.7 |
|  | 7 | 1.2 |

The above tests establish the value in use of the zinc ion in small amounts, e.g., 2 p.p.m., over the synergized polyphosphate and the standard corrosion cooling water in reduction of corrosion rate of admiralty metal.

EXAMPLE VI

A compressed ball of a standard weight and dimension was prepared containing the following ingredients in the quantities noted:

50 parts by weight of glassy septaphosphate
7 parts by weight of sodium ferrocyanide
27 parts by weight of anhydrous tetrasodium pyrophosphate
8 parts by weight of lignosulfite binder (Bindarene)
8 parts by weight of zinc sulfate·$1H_2O$
8 parts of water The above composition of matter, after briquetting, is suitable for mechanically measured addition in water treatment wherein a ball-feeder is employed.

In practice of the invention, as previously noted, orthophosphates may be substituted for polyphosphates but corrosion tests of the nature described above have established the polyphosphates to be more effective and efficient for the purposes of this invention, particularly at higher temperatures. For example, corrosion rates begin to level off at about 3 to 4 m.p.y. for the polyphosphate as compared to 7 to 8 m.p.y. for the orthophosphates. The theoretical reasons for the inhibiting quality of the minor quantities of metal cations are not known. There is some evidence to substantiate that the corrosion inhibition mechanism of the polyphosphates and the polyphosphate-cyanide compositions involves the formation of a protective film which may be of only molecular thickness. The small amount of metal ion may then have the function of plugging holes in this film. The voids would represent areas especially susceptible to a pitting type of attack because of the potential difference established with the surrounding film. These voids might also represent points of origin on a metal surface more prone to protection by strong cathodic inhibitors, illustratively, zinc. This would be especially true if the polyphosphate-ferrocyanide film involved some degree of anodic protection.

One possible explanation of the deleterious effect of overtreating with excesses of metal cations is advanced that once the holes in the film are filled, the remaining metal cation in excess may tend to pull the polyphosphate film from the metal surface by some form of electrostatic attraction. Another theory of merit proposes formation of a deposit of metal-orthophosphate sludge on the iron surface leading to the development of concentration cells.

In the commercial practice of this invention, zinc is preferred over cadmium and others of the metal ions shown to be advantageous as it is readily available at reasonable cost and is not objectionable from a toxicity viewpoint.

From a large number of exploratory examples of the nature of those hereinbefore set out, it has been determined that compositions giving rise to treated waters effective to inhibit corrosion contain from 1.1 to 54 p.p.m. of phosphate as $PO_4$; 0.4 to 8.5 p.p.m. of cyanide as CN; and 0.85 to 9 p.p.m. of cations selected from the group consisting of cobalt, cerium, chromium, manganese, cadmium, lead, zinc, tin and nickel. The water-soluble salts of the foregoing metal cations are advantageously used for the purposes of the invention. When in solution in the water to be treated the phosphate (as $PO_4$) is preferably at a level of from 20 to 40 p.p.m. the cyanide preferably from 2.8 to 7.8 p.p.m., and the selected metal cation preferably from 1 to 9 p.p.m.

In the corrosion inhibiting compositions to be added to the corrosive fluid the range of weight ratios of $CN:PO_4$ are 0.005 to 0.33 and preferably about 0.99 to 0.20.

From the above description and limitations in the preparation and end use of the corrosion inhibiting products of this invention, one can provide suitable aqueous concentrates, dry materials or tabletted or briquetted products useful to provide commercial means for coolant water treatment.

Having thus described the invention, what we claim is:

1. A method of inhibiting corrosion of metals in contact with water which comprises adding to said water (1) a water-soluble phosphate, (2) a water-soluble inorganic complex cyanide, and (3) a salt of a metallic cation selected from the group consisting of water-soluble salts of cobalt, cerium, chromium, manganese, cadmium, lead, zinc, tin and nickel; the quantity of $PO_4$ ion from said phosphate in said water being within the range of 1.1 to 54 parts per million; the quantity CN ion from said inorganic cyanide being within the range of 0.4 to 8.5 parts per million; and said metal cation being within the range of 0.85 to 9 parts per million of the water so treated.

2. The method of claim 1 wherein the water-soluble salt of a metallic cation is a zinc salt.

3. The method of claim 1, wherein the water-soluble salt of a metallic cation is zinc sulfate.

4. The method of claim 1 wherein the concentration of the metallic cation is from about 1 to about 8 p.p.m. of the treated water.

5. A method of inhibiting corrosion of metals in water at temperatures above about 150° F. which comprises adding to said water (1) a water-soluble polyphosphate, (2) a water-soluble alkali metal ferrocyanide, and (3) a salt of a metallic cation selected from the group consisting of water-soluble salts of cobalt, cerium, chromium, manganese, cadmium, lead, zinc, tin and nickel; the quantity of $PO_4$ ion from said polyphosphate being within the range of 1.1 to 54 parts per million; the quantity of CN ion from said alkali metal ferrocyanide being within the range of 0.4 to 8.5 parts per million; and the quantity of the metal cation being within the range of from 0.85 to 9 parts per million; and the weight ratio of said cyanide ion to said phosphate ion being within the range of 0.005 to 0.33.

References Cited in the file of this patent

UNITED STATES PATENTS

| Re. 23,740 | Ryznar et al. | Nov. 17, 1953 |
| 2,155,045 | Griffith et al. | Apr. 18, 1939 |
| 2,418,608 | Thompson et al. | Apr. 8, 1947 |
| 2,499,261 | Rosenbloom | Feb. 28, 1950 |
| 2,711,391 | Kahler | June 21, 1955 |
| 2,877,085 | George et al. | Mar. 10, 1959 |
| 2,900,222 | Kahler et al. | Aug. 18, 1959 |

UNITED STATES PATENT OFFICE
CERTIFICATE OF CORRECTION

Patent No. 3,151,087 September 29, 1964

John W. Ryznar et al.

It is hereby certified that error appears in the above numbered patent requiring correction and that the said Letters Patent should read as corrected below.

Column 3, line 48, after "advantages" insert -- of both --; column 6, line 13, for "43" read -- 4-3 --; column 8, line 20, for "0.99" read -- 0.09 --.

Signed and sealed this 26th day of January 1965.

(SEAL)
Attest:

ERNEST W. SWIDER
Attesting Officer

EDWARD J. BRENNER
Commissioner of Patents